3,530,154
PROCESS FOR THE CONTINUOUS PREPARATION OF ADDITION PRODUCTS OF ETHYLENE OXIDE TO CARBOXYLIC ACIDS
Werner Stein, Erkrath-Unterbach, and Wilfried Umbach, Langenfeld, Rhineland, Germany, assignors to Henkel & Cie, G.m.b.H., Dusseldorf-Holthausen, Germany, a corporation of Germany
No Drawing. Filed July 14, 1967, Ser. No. 653,320
Claims priority, application Germany, Aug. 9, 1966, H 60,194
Int. Cl. C11c 3/00
U.S. Cl. 260—410.6      10 Claims

ABSTRACT OF THE DISCLOSURE

This invention relates to an improved process for the continuous production of addition products of ethylene oxide with organic carboxylic acids which comprises in combination (a) continuously passing a mixture of an organic compound selected from the group consisting of organic carboxylic acids free from reactive hydrogen atoms other than the carboxyl hydrogen atom and addition products of ethylene oxide thereof, with ethylene oxide in a molar ratio of 1:1 to 1:6 in the presence of from 0.01% to 1% by weight of alkali metal based on said organic compound, of an alkali metal ethoxylation catalyst, through a jacketed reactor having a small cross-section compared to its length, under a pressure at which the reaction mixture is liquid, (b) heating said mixture while passing through said jacketed reactor to attain a maximum temperature of between about 230° C. and 390° C., (c) maintaining said mixture in said jacketed reactor for about 10 to 150 seconds, whereby an addition product is formed, (d) immediately cooling said addition product to a temperature below 180° C. after said addition product leaves said jacketed reactor, and (e) recovering said addition product. More particularly, the invention relates to a process for the preparation of products with a high content of ethyleneglycol carboxylic acid monoesters in high volume-time-yields.

THE PRIOR ART

It is generally known that carboxylic acids can be convetred with ethylene oxide, in the presence of the alkaline catalysts commonly used for ethoxylations, into carboxylic acid esters of ethyleneglycol and polyethyleneglycols. According to the book by H. Schönfeldt "Oberflächenaktive Anlagerungsprodukte des Äthylenoxyds," Stuttgart 1959, page 36 and following, as well as according to the article by Wrigley et al. "Reaktion von Athylenoxyd oder Propylenoxyd mit langkettigen Fettsäuren" (reaction of ethylene oxide or propylene oxide with long-chain fatty acids), in Zeitschrift 1, Am. Oil Chem. Soc. vol. 36, January 1959, pages 34–36, reaction mixtures containing ethyleneglycol or polyethyleneglycol monoesters, ethyleneglycol or polyethyleneglycol diesters and polyethyleneglycols result therefrom. In the work by Schönfeldt, on page 39, Table 5, the composition of various ester adducts prepared by ethoxylation of fatty acids as well as by esterification of fatty acids with polyethyleneglycols is indicated. By this process, the polyglycol contents amount to 15% to 23%, the monoester contents to 32% to 60%, and the diester contents to 27% to 45%. Similar values are given in Table I on page 35 of the said periodical, wherein the composition of products, resulting from the ethoxylation of fatty acids or monoesters, is given as follows: 14 to 41 mol percent of glycols; 32 to 45 mol percent of monoesters, and 24 to 50 mol percent of diesters. The preparation of the addition products was effected by working at high temperatures, which, however, furnished only insignificant volume-time-yields. With the view to find a possibility to control the reaction procedure under preferable formation of monoesters, it is stated on page 35, left column of the said periodical, that this can be accomplished by combining various conditions, such as low reaction temperatures, increased content of catalysts and more effective stirring.

Since starting the technical preparation of ethylene oxide addition compounds, any number of experiments have been effected to increase the volume-time-yields by continuously developing and elaborating the procedures, as well as to direct the reaction in the sense of the preferred formation of ethyleneglycol or polyethyleneglycol monoesters.

According to the German Pat. No. 735,418, the reaction was conducted in a reactor tube with the objective to obtain larger volume-time yields. This reactor tube was encircled by a jacket tube, through which oil was circulated to effect and to maintain the reaction temperature. The reaction was conducted in the presence of alkaline catalysts at a pressure of 100 to 200 atmospheres. It was pointed out, that the temperature of the heating liquid should not exceed a specific degree, as otherwise a pronounced temperature gradient will occur in the interior of the reactor tube. If this occurred, the desired reaction was pushed into the background by secondary reactions and a useless product was obtained. As a rule, those reaction temperatures were employed which were substantially below 200° C.

The German Pat. No. 855,111 describes a continuous process for the addition of ethylene oxide to organic compounds, which contain at least one reactive hydrogen atom. According to this process, these starting substances are finely dispersed in an absorption zone and ethylene oxide is continuously introduced at a rate, which maintains the total pressure in the reaction vessel essentially constant. The temperature of the liquid product in the reaction vessel should not exceed 200° C., preferably 175° C.

Furthermore, the published German Auslegeshcrift No. 1,180,370 describes a process for the continuous preparation of ethoxylation products, by which the organic starting compound, containing at least one active hydrogen atom, is passed at temperatures between 20° and 200° C., preferably between 60° and 180° C., in a reaction vessel containing filler bodies and is treated with ethylene oxide at a pressure between 6 to 60 atmospheres. The volume-time-yields obtained by this process, are comparatively very low.

In addition to the efforts to increase the volume-time-yields, numerous attempts have been made to conduct the addition of ethylene oxide to carboxylic acid in such a manner, that primarily ethyleneglycol carboxylic acid monoesters are obtained. The U.S. Pat. No. 2,910,490 describes a discontinuous process, whereby carboxylic acids are reacted with ethylene oxide in the presence of ammonium or alkylammonium halides as catalysts at temperatures of 75 to 175° C. The content of monoesters in the reaction products is very high, when a temperature range of 100 and 140° C. is maintained. It is in particular pointed out in the patent that at reaction temperatures above 175° C. the content of monoesters in the reaction products decreases.

The status of the prior art, as described, shows that, up to now, it has not met with success to effect the continuous addition of ethylene oxide to carboxylic acids in the presence of the usual alkaline catalyst at temperatures substantially above 200° C., to obtain in this manner an adequate increase in volume-time-yields. In particular, the preparation of products having a high content of ethyleneglycol carboxylic acid monoesters by addition of ethylene oxide to carboxylic acids could not be effected with the obtention of greater volume-time-yields.

OBJECTS OF THE INVENTION

An object of the invention is to effect the continuous addition of ethylene oxide to carboxylic acids with high volume-time-yields. In particular, in the case of the addition in the molar ratio of 1 to 1, reaction products with a high content of ethyleneglycol carboxylic acid monoesters are obtained in addition to small amounts of by-products.

Another object of the invention is to develop a process for the continuous production of addition products of ethylene oxide with organic carboxylic acids which comprises in combination (a) continuously passing a mixture of an organic compound selected from the group consisting of organic carboxylic acids free from reactive hydrogen atoms other than the carboxylic hydrogen atom and addition products of ethylene oxide thereof, with ethylene oxide in a molar ratio of 1:1 to 1:6 in the presence of from 0.01% to 1% by weight of alkali metal based on said organic compound, of an alkali metal ethoxylation catalyst, through a jacketed reactor having a small cross-section compared to its length, under a pressure at which the reaction mixture is liquid, (b) heating said mixture while passing through said jacketed reactor to attain a maximum temperature of between about 230° C. and 390° C. (c) maintaining said mixture in said jacketed reactor for about 10 to 150 seconds, whereby an addition product is formed, (d) immediately cooling said addition product to a temperature below 180° C. after said addition product leaves said jacketed reactor, and (e) recovering said addition product.

These and other objects of the invention will become more apparent as the description thereof proceeds.

DESCRIPTION OF THE INVENTION

According to the invention, these objects are achieved in that the reaction is conducted with very short durations and at reaction temperatures, the maximum of which substantially exceeds 200° C., provided the following conditions are observed:

(A) Carboxylic acids or addition products of ethylene oxide to these acids are passed together with ethylene oxide in a molecular ratio of 1:1 to 1:6, in the presence of the usual alkaline catalysts and under a pressure which maintains the reaction mixture in liquid form, through reactors having a small cross section compared to the length, which are encircled by a heat exchanger jacket.

(B) The mixture is heated in such a manner, that it attains in the reactor, maximum temperatures of between 230° C. and 390° C., preferably between 240° and 360° C. The heating can be effected in a manner, that after travelling through the first half of the zone of the reactor enclosed in the heat exchanger jacket, the mixture attains a temperature of between 170° and 240° C., and that in the second half of this zone the mixture attains a maximum temperature of between 240° and 390° C.

(C) The duration of passage of the reaction mixture through the zone of the reactor encircled by the heat exchanger jacket amounts to about 10 to 150 seconds, preferably 15 to 80 seconds.

(D) The concentration of the catalyst amounts to 0.01% to 1% by weight preferably 0.05% to 0.5% by weight of alkali metal, based on the starting carboxylic acid compound to be ethoxylated.

(E) Immediately after leaving the zone of the reactor encircled by the heat exchanger jacket, the product is cooled to a temperature below 180° C. preferably below 150° C.

Serving as starting organic carboxylic acid compounds for the process of the invention are aliphatic or cycloaliphatic mono- or poly-carboxylic acids, preferably fatty acids having from 6 to 26 carbon atoms, which may be straight or branched, and which may contain also one or several double bonds. Preferred are the natural fatty acids and dimeric fatty acids. Other carboxylic acids obtained through oxidation of hydrocarbons or by carboxylation of olefin or acetylene hydrocarbons are also utilizable.

It is preferable to employ alkanoic acids having 6 to 26 carbon atoms such as lauric acid, mixtures of $C_8$ to $C_{10}$ fatty acids, mixtures of $C_{12}$ to $C_{18}$ fatty acids, etc.; alkenoic acids having 6 to 26 carbon atoms such as oleic acid, erucic acid, etc.; and other naturally occurring fatty acids having 6 to 26 carbon atoms.

Furthermore, the addition products of ethylene oxide to the above indicate organic carboxylic acids can be used as starting substances. This would be considered in all of those cases, where a greater number of ethylene oxide moieties are to be added, since, as a rule, due to the heat emission, not more than 6 mols of ethylene oxide should be added in one process step. Therefore, it is advantageous to effect the addition in one or several process steps according to the ethylene oxide contents desired in the end product, whereby the reaction product of the first step serves as starting substance for the next step.

For the process of the invention, the usual alkaline catalysts are employed, for example, the alkali metal hydroxides such as sodium hydroxide, potassium hydroxide; the alkali metal alkanolates or phenolates; the sodium or potassium soaps, or the alkali metals such as sodium or potassium. As a rule, the amount of the catalyst ranges between 0.01% to 1% by weight, preferably 0.05 to 0.5% by weight of alkali metal, based on the weight of the starting organic compounds to which ethylene oxide is to be added. It is of advantage to use anhydrous catalysts and, in the case of using caustic alkalis, to remove the water formed during the formation of the salt from the mixture. Furthermore, it is advantageous when using alkali metal alkanolates in lower alkanols, to distill the latter prior to the reaction with ethylene oxide.

The pressure in the reactor should be selected so that the reaction mixture will always be in liquid form even at the elevated reaction temperatures of the invention. The pressure ranges advantageously between 50 and 110 atmospheres.

The reaction is conducted in reaction vessels which have a small cross-section in comparison with their length. For example, pressure tubes or reactor coils having a diameter of about 3 to 12 mm., preferably of about 5 to 10 mm., are suitable. Instead of these tubes, so-called slit-ring reactors may be used or reactors with an oval cross-section of an oblate form chosen at random. In any case, the reaction vessels should be of such a dimension as to render a sufficient heat exchange possible.

The length of the reactors may, according to the reaction temperatures indicated and to the short duration dependent thereon, amount for example to 10 and 100 meters when a tubular reactor is used.

The specific reaction vessels are encircled by a heat exchanger jacket which, on the one hand, renders a rapid heating of the reaction mixture possible and which, on the other hand, guarantees a sufficiently rapid evolution of the heat developed after the intensely exothermic reaction has started. The heat exchanger may be subdivided into several zones adjusted to various temperatures. However, this measure is not absolutely necessary. In fact, it has been found advantageous to use a single-zoned heat exchanger. This can be filled with water adjusted to the desired temperature by means of regulation by pressure. In this manner, due to the high heat of evaporation of the water, an especially effective cooling is attained. Instead of water, however, different media be employed. The temperature of the heat exchanger is, as a rule, maintained between about 160° C. and 250° C.

It has been found advantageous to install a circulating pump in the system of the heat exchanger containing water under pressure, by which the water, gradually cooling in the first half of the zone of the exchanger, is continuously pumped into the second half of this zone where maximum temperatures, caused by the exothermic reaction, prevail. Still other technical process measures can be employed, which enable an adjustment of variable temperatures in the exchanger possible.

The course of the temperature during the reaction in a specific apparatus can be controlled by the temperature in the heat exchanger jacket, by the velocity of the flow of the reaction mixture and by the kind and quantity of the catalyst used. It should be taken into consideration that the evolution of heat of the reaction mixture is accelerated in proportion as the content of ethylene oxide in the reaction mixture is increased. Likewise, at identical molar ratios, more heat is evolved in the reaction of low molecular weight starting substances with ethylene oxide of equal reaction volumes than in the reaction of high molecular weight starting substances.

Since, generally, the starting carboxylic acid compounds, the amount of ethylene oxide to be added and the catalyst amount are predetermined, the desired temperature progress of the reaction can easily be adjusted by regulating either the flow rate or the duration of passage of the reaction mixture through the reactor and the temperature in the heat exchanger or both. For this purpose it is only necessary to measure the reaction temperatures in the various sections of the reaction vessel and to adjust either the flow rate or the temperature in the heat exchanger or both, to effect the optimum continuous reaction.

The reaction mixture is first heated in such a manner that, in the first half of the zone of the reactor, encircled by the heat exchanger jacket, a reaction temperature of between 170° C. to 240° C. is obtained. The temperature of the heat exchanger is controlled in such a way, that the reaction mixture in the second half of this zone attains a maximum temperature of between 240° C. and 390° C., preferably between 240° C. and 360° C., and thereafter the reaction mixture is cooled.

It may be of advantage to preheat the starting material either separately or combined as a mixture. The flow rate is regulated in such a way that the duration of passage of said mixture through the reaction zone lasts about 10 to 150 seconds, preferably from 15 to 80 seconds. Attention should be paid to the fact that, with increased temperatures in the heat exchanger, the duration of passage of the reaction mixture through the reaction vessel has to be shortened.

The progress of the reaction of the reactants can easily be followed by determining the course of the curve of the internal temperature of the reactants in the reactor at various points over the length of the reactor. It has been discovered that it is of advantage for the obtention of an optimal yield of light colored and odorless reaction products, that the product passage in the reaction zone between the time of attaining the maximum temperature and leaving the heated zone does not amount to more than about 5% to 30% of the total duration of the passage of the reactants through the reaction zone.

Furthermore, it is essential to cool the reaction product immediately after leaving the heated zone to temperatures below 180° C., preferably below 150° C., as, otherwise, an increasing discoloration of the product is noted.

This process of the invention offers very special advantages when it is desired to obtain ethyleneglycol carboxylic acid monoesters with high area-time-yields, substantially free of any by-products. This can be accomplished by observing a part of the process conditions in the manner described in the following.

(A) Fatty acids and ethylene oxide are passed through the reactor in a molar ratio of 1:1.

(B) The maximum temperature prevailing in the reactor is adjusted to range between 230° C. and 290° C.

(C) The duration of passage of the reactants through the zone of the reactor encircled by the heat exchanger amounts to about 10 to 120 seconds.

Since, in certain apparatus, at predetermined temperatures, only the concentration of the catalyst and the duration of passage of the reactants through the reactor zone encircled by a heat exchanger are variable, the composition of the reaction product can be controlled by a suitable selection of these two values. Thus, the content of the unreacted carboxylic acid, which, according to the purpose of the utilization of the products, can be high or low, can be regulated, at fixed catalyst concentrations, by varying the duration of passage or, at fixed duration of passage, by varying the concentration of the catalyst. At lower concentrations of the catalyst, the ratio of monoester to diester in the reaction product is, in principle, independent of the duration of passage through the reactor. However, at higher concentrations of the catalyst, extremely short durations have to be employed to obtain an optimal mono/diester ratio with regard to a low content of diester. Thereby, an additional advantage is attained in that at an optimal adjusted mono/diester ratio in favor of the monoester is had and also the glycol or polyglycol content of the reaction product is very insignificant.

With reference to the preparation of polyethyleneglycol carboxylic acid esters it is advisable, on the one hand, as a first step to prepare the corresponding ethyleneglycol carboxylic acid monoesters, then in one or several steps to add additional amounts of ethylene oxide thereto. However, it is also possible to use in the very first step the total amount of ethylene oxide up to a molar ratio of 1 to 6. On the other hand, additional amounts of ethylene oxide can be added to the products thus obtained in one or several steps, selecting molar ratios of 1:1 to 1:6.

Reaction products having an excellent quality are obtained with high area-time-yields. It is a startling fact, that at high temperatures which until now had been considered as impossible for the realization of end products substantially free of any by-products, no decomposition of the reaction products occurs, and that in spite of the short reaction durations a nearly complete reaction takes place. Particularly since, as it is well known, carboxylic acids due to their high acidity, manifest a low reaction rate in comparison with the ethylene oxide.

The products obtained can be employed as textile adjuvants, as emulsifiers in the cosmetic as well as pharmaceutical fields, as raw substances in the field of detergents as well as control means of viscosity in the field of synthetics.

The following specific embodiments are illustrative of the practice of the invention. They are not, however, to be deemed limitative in any manner.

EXAMPLES

The examples, described in the following, were conducted in a coil reactor, the pressure tube of which had an interior diameter of 9 mm. and a length of 12.5 meters. It was provided with temperature gauges after each 1.25 meters of tube length. The temperature in the water-filled heat exchanger was regulated so that the pressure was maintained constant with the aid of a valve. The reaction heat was eliminated by means of evaporating the water. The vapor, escaping through the valve, was condensed in a cooling device under normal pressure and then pumped back into the apparatus in such a manner, that the water level in the pressure jacket remained constant. The water level in the pressure jacket was maintained so that the coil reactor was submerged.

To bring the carboxylic acid, ethylene oxide mixture, fed into the reactor, to reaction temperature as rapidly as possible, the water having been condensed during the circulation was pre-heated before introduction into the pressure jacket and additional energy was supplied to the reactor by heating. The carboxylic acid was preheated to about 120° C. In addition, the water in the heat exchanger pressure jacket was continuously circulated by means of a circulation pump.

The carboxylic acid admixed with the catalyst and the ethylene oxide were fed through separate pipes, by means of dosing pumps, into a mixing chamber, wherein the components were thoroughly admixed and subsequently passed directly into the reactor. The pressure in the reactor coils was maintained between 50 and 110 atmospheres.

The reaction product leaving the reactor coil was cooled to below 100° C. in a compression cooler and depressurized in an evaporation vessel.

For the purpose of calculating the duration of passage of the product through the reactor, the individual acids used in the examples were calculated with the following densities:

| | |
|---|---|
| $C_8$ to $C_{10}$ fatty acid mixture | 0.856 |
| Lauric Acid | 0.870 |
| $C_{12}$ to $C_{18}$ fatty acid mixture | 0.845 |
| Oleic Acid | 0.854 |
| $C_8$ to $C_{10}$ fatty acid mixture +1 mol of ethylene oxide | 0.906 |
| $C_{12}$ to $C_{18}$ fatty acid mixture +1 mol of ethylene oxide | 0.871 |
| Oleic acid +1 mol of ethylene oxide | 0.875 |
| Oleic acid +4 mols of ethylene oxide | 0.915 |

The analytical composition of the carboxylic acid, ethylene oxide adducts was determined according to a method used by Malkemus and Swan, J. Am. Oil Chem. Soc., 34, 342 (1957). The fact that the obtained values did not add up each time to 100% was based on discrepancies in the method of analysis.

Example 1

Lauric acid was reacted with such a quantity of a sodium methylate solution that the acid, after the methanol had been removed by evaporation under vacuum at 80° to 100° C., contained 0.2% by weight of sodium. The catalyst-containing fatty acid and ethylene oxide (molar ratio=1:1) were pumped through the reactor previously described at such a rate that about 45 kg. of an addition product of 1 mol of ethylene oxide to 1 mol of lauric acid were produced per hour. The vapor pressure in the heat exchanger pressure jacket was adjusted to 29 atmospheres corresponding with a temperature of 231° C., and the pressure present in the reactor coil was adjusted to 60 to 70 atmospheres. The maximum temperature attained in the reactor coil was 252° C., and the duration of progress of the product through the reactor coil lasted about 55 seconds. According to the analysis, the nearly colorless product had the following composition:

| | Percent |
|---|---|
| Lauric acid | 9.3 |
| Glycol or polyglycol | 1.1 |
| Ethyleneglycol monolaurate | 75.2 |
| Ethyleneglycol dilaurate | 12.7 |

A lauric acid+1 mol of ethylene oxide adduct, prepared for comparison in the usual discontinuous process method in an autoclave, using 0.2% by weight of sodium as catalyst based on the lauric acid, at a temperature of 143° to 152° C. and at a reaction duration of three and a quarter hours had, according to the analysis, the following composition:

| | Percent |
|---|---|
| Lauric acid | 0.1 |
| Glycol or polyglycol | 8.0 |
| Ethyleneglycol monolaurate | 42.4 |
| Ethyleneglycol dilaurate | 48.9 |

Example 2

Lauric acid was reacted with such an amount of a sodium methylate solution that the acid, after the methanol had been removed by evaporation under vacuum at 80° to 100° C., contained 0.3% by weight of sodium The catalyst-containing fatty acid and ethylene oxide (molar ratio=1:1) were pumped through the previously described reactor at such a rate that about 35 kg. of an addition product of 1 mol of ethylene oxide to 1 mol of lauric acid were produced per hour. The vapor pressure in the heat exchanger pressure jacket was adjusted to 29 atmospheres, corresponding with a temperature of 231° C., and the pressure present in the reactor coil was adjusted to 50 to 60 atmospheres. The maximum temperature attained in the reactor coil was 260° C. and the duration of progress of the product through the reactor coil lasted about 71 seconds. According to the analysis, the nearly colorless product had the following composition.

| | Percent |
|---|---|
| Lauric acid | 0.2 |
| Glycol or polyglycol | 1.1 |
| Ethyleneglycol monolaurate | 75.0 |
| Ethyleneglycol dilaurate | 20.0 |

A lauric acid+1 mol of ethylene oxide adduct, prepared for comparison in the usual discontinuous process method in an autoclave, using 0.3% by weight of sodium as catalyst based on the lauric acid, at a temperature of 140° to 147° C. and at a reaction duration of three and a half hours had, according to analysis, the following composition:

| | Percent |
|---|---|
| Lauric acid | 0 |
| Glycol or polyglycol | 7.0 |
| Ethyleneglycol monolaurate | 41.0 |
| Ethyleneglycol dilaurate | 52.0 |

Example 3

Lauric acid was reacted with such an amount of a sodium methylate solution that the acid, after the methanol had been removed by evaporation under vacuum at a temperature of 80° to 100° C. contained 0.3% by weight of sodium. The catalyst-containing fatty acid and ethylene oxide (molar ratio=1:1) were pumped through the previously described reactor at such a rate that about 54 kg. of an addition product of 1 mol of ethylene oxide to 1 mol of lauric acid were produced per hour. The vapor pressure of the heat exchanger pressure jacket was adjusted to 28.2 atmospheres, corresponding with a temperature of 229° C., and the pressure present in the reactor coil was adjusted to 75 to 85 atmospheres. The maximum temperature attained in the reactor coil was 254° C., and the duration of progress of the product through the reactor coil lasted about 46 seconds. According to the analysis, the nearly colorless product had the following composition:

| | Percent |
|---|---|
| Lauric acid | 5.4 |
| Glycol or polyglycol | 0.7 |
| Ethyleneglycol monolaurate | 78.8 |
| Ethyleneglycol dilaurate | 11.2 |

Here, too, the comparison example as given in Example 2 is valid with the following analysis:

| | Percent |
|---|---|
| Lauric acid | 0 |
| Glycol or polyglycol | 7.0 |
| Ethyleneglycol monolaurate | 41.0 |
| Ethyleneglycol dilaurate | 52.0 |

Example 4

Lauric acid was reacted with such an amount of a sodium methylate solution that the acid, after evaporation of the methanol under vacuum at a temperature of 80° to 100° C., contained 0.35% by weight of sodium. The catalyst-containing fatty acid and ethylene oxide (molar ratio of 1:1) were pumped through the previously described reactor at such a rate, that about 67 kg. of an addition product of 1 mol of ethylene oxide to 1 mol of lauric acid were produced per hour. The vapor pressure in the heat exchanger pressure jacket was adjusted to 28 atmospheres, corresponding to a temperature of 229° C., and the pressure in the reactor coil was adjusted to 75 to 80 atmospheres. The maximum temperature attained in the reactor coil was 256° C., and the duration of progress of the product through the reactor coil lasted about 37 seconds. The nearly colorless product had, according to the analysis, the following composition:

| | Percent |
|---|---|
| Lauric acid | 1.9 |
| Glycol or polyglycol | 0 |
| Ethyleneglycol monolaurate | 79.7 |
| Ethyleneglycol dilaurate | 13.8 |

A lauric acid+1 mol of ethylene oxide adduct, prepared for comparison in the usual discontinuous process in an autoclave, using 0.35% by weight of sodium as catalyst, based on the lauric acid, at a temperature of 150° C. and a reaction duration of 2½ hours had, according to the analysis, the following composition:

| | Percent |
|---|---|
| Lauric acid | 0.3 |
| Glycol or polyglycol | 3.4 |
| Ethyleneglycol monolaurate | 41.2 |
| Ethyleneglycol dilaurate | 53.0 |

Example 5

Lauric acid was reacted with such an amount of a sodium methylate solution that the acid, after evaporation of the methanol under vacuum at a temperature of 80° to 100° C, contained 0.4% by weight of sodium. The catalyst-containing fatty acid and ethylene oxide (molar ratio of 1:1) were pumped through the previously described reactor at such a rate, that about 75 kg. of an addition product of 1 mol of ethylene oxide to 1 mol of lauric acid were produced per hour. The vapor pressure in the heat exchanger pressure jacket was adjusted to 29 atmospheres, corresponding to a temperature of 231° C., and the pressure in the reactor coil was adjusted to 75 to 85 atmospheres. The maximum temperature attained in the reactor coil was 255° C., and the duration of progress of the product through the reactor coil lasted about 33 seconds. The nearly colorless product had, according to the analysis, the following composition:

| | Percent |
|---|---|
| Lauric acid | 3.5 |
| Glycol or polyglycol | 0 |
| Ethyleneglycol monolaurate | 81.0 |
| Ethyleneglycol dilaurate | 10.3 |

A lauric acid+1 mol of ethylene oxide adduct, prepared for comparison in the usual discontinuous process, in an autoclave using 0.4% by weight of sodium as catalyst, based on the lauric acid, at a temperature of 150° C. and a reaction period of 2¾ hours, had according to the analysis the following composition:

| | Percent |
|---|---|
| Lauric acid | 0.3 |
| Glycol or polyglycol | 8.7 |
| Ethyleneglycol monolaurate | 36.4 |
| Ethyleneglycol dilaurate | 51.2 |

Example 6

Lauric acid was reacted with such an amount of a sodium methylate solution that the acid, after evaporation of the methanol under vacuum at a temperature of 80° to 100° C., contained 0.44% by weight of sodium. The catalyst-containing fatty acid and ethylene oxide (molar ratio of 1:1) were pumped through the previously described reactor at such a rate that about 82 kg. of an addition product of 1 mol of ethylene oxide to 1 mol of lauric acid were producer per hour. The vapor pressure in the heat exchanger pressure jacket was adjusted to 29 atmospheres, corresponding to a temperature of 231° C., and the pressure in the reactor coil was adjusted to 65 to 75 atmospheres. The maximum temperatures attained in the reactor coil was 254° C., and the duration of progress of the product through the reactor coil lasted about 30 seconds. The nearly colorless product had, according to the analysis, the following composition:

| | Percent |
|---|---|
| Lauric acid | 4.6 |
| Glycol or polyglycol | 1.9 |
| Ethyleneglycol monolaurate | 75.4 |
| Ethyleneglycol dilaurate | 15.2 |

A lauric acid+1 mol of ethylene oxide adduct, prepared for comparison in the usual discontinuous process method in an autoclave using 0.44% by weight of sodium as catalyst, based on the lauric acid, at a temperature of 150° C. and a reaction period of two and three quarter hours had, according to the analysis, the following composition:

| | Percent |
|---|---|
| Lauric acid | 0.2 |
| Glycol or polyglycol | 7.7 |
| Ethyleneglycol monolaurate | 38.6 |
| Ethyleneglycol dilaurate | 48.0 |

Example 7

Lauric acid was reacted with such an amount of a sodium methylate solution that the acid, after evaporation of the methanol under vacuum at a emperature of 80° to 100° C., contained 0.44% by weight of sodium. The catalyst-containing fatty acid and ethylene oxide (molar ratio of 1:1) were pumped through the previously described reactor at such a rate, that about 102 kg. of an addition product of 1 mol of ethylene to 1 mol of lauric acid were produced per hour. The vapor pressure in the heat exchanger pressure jacket was adjusted to 26.4 atmospheres corresponding to a temperature of 225° C., and the pressure in the reactor coil was adjusted to 55 to 70 atmospheres. The maximum temperature attained in the reactor coil was 241° C., and the duration of progress of the product through the reactor coil lasted about 24 seconds. The nearly colorless product had, according to the analysis, the following composition:

| | Percent |
|---|---|
| Lauric acid | 9.5 |
| Glycol or polyglycol | 0.4 |
| Ethyleneglycol monolaurate | 71.0 |
| Ethyleneglycol dilaurate | 15.3 |

Here too, the comparison example given under Example 6 is valid.

Example 8

A $C_{12}$ to $C_{18}$ fatty acid mixture, with an acid number of 251.2 and an average molecular weight of 223 (chain length distribution = 45.5% of $C_{12}$; 18.5% of $C_{14}$; 13% of $C_{16}$ and 23% of $C_{18}$), was reacted with such an amount of a sodium methylate solution, that the acid mixture, after evaporation of the methanol under vacuum at a temperature of 80° to 100° C., contained 0.3% by weight of sodium.

The catalyst-containing fatty acid mixture and ethylene oxide (molar ratio of 1:1) were pumped through the previously described reactor at such a rate, that about 44 kg. of an addition product of 1 mol of ethylene oxide to 1 mol of the fatty acid mixture were produced per hour. The vapor pressure of the heat exchanger pressure jacket was adjusted to 27.2 atmospheres, corresponding to the temperature of 227° C., and the pressure in the reactor coil was adjusted to 50 to 60 atmospheres. The maximum temperature attained in the reactor coil was 249° C., and the duration of progress of the product through the reactor coil lasted about 55 seconds. The nearly colorless product had according to analysis the following composition:

| | Percent |
|---|---|
| $C_{12}$ to $C_{18}$ fatty acid | 4.3 |
| Glycol or polyglycol | 0 |
| Ethyleneglycol mono-$C_{12}$ to $C_{18}$ fatty acid ester | 83.3 |
| Ethyleneglycol di-$C_{12}$ to $C_{18}$ fatty acid ester | 9.1 |

Example 9

A $C_8$ to $C_{10}$ fatty acid mixture with an acid number 352 and an average molecular weight of 159.4 (chain length distribution=2.5% of $C_6$, 49.0% of $C_8$, 46.5% of $C_{10}$ and 2.0% of $C_{12}$) was reacted with such an amount of a sodium methylate solution, that the acid mixture, after evaporation of the methanol under vacuum at a temperature of 80° to 100° C., contained 0.3% by weight of sodium. The catalyst-containing fatty acid mixture and ethylene oxide (molar ratio of 1:1) were pumped through the previously described reactor at such a rate, that about 42 kg. of an addition product of 1 mol of ethylene oxide to 1 mol of the fatty acid mixture were produced per hour. The vapor pressure in the heat exchanger pressure jacket was adjusted to 29.5 atmospheres, corresponding to the temperature of 232° C., and the pressure in the reactor coil was adjusted to 50 to 55 atmospheres. The maximum temperature attained in the reactor coil was 272° C., the the duration of the passage of the product through the reactor coil lasted about 58 seconds. The nearly colorless reaction product had according to the analysis the following composition:

| | Percent |
|---|---|
| $C_8$ to $C_{10}$ fatty acid | 1.7 |
| Glycol or polyglycol | 1.4 |
| Ethyleneglycol mono-$C_8$ to $C_{10}$ fatty acid ester | 82.4 |
| Ethyleneglycol di-$C_8$ to $C_{10}$ fatty acid ester | 12.1 |

Example 10

Oleic acid with an acid number of 201.7 and an iodine number of 90.1, was reacted with such an amount of a sodium methylate solution, that the acid, after evaporation of the methanol under vacuum at a temperature of 80° to 100° C., contained 0.3% of sodium. The catalyst-containing acid and ethylene oxide (molar ratio of 1:1) were pumped through the previously described reactor at such a rate, that about 38 kg. of the addition product of 1 mol of ethylene oxide to 1 mol of oleic acid were produced per hour. The vapor pressure in the heat exchanger pressure jacket was adjusted to 28.5 atmospheres, corresponding to a temperature of 230° C., and the pressure in the reactor coil was adjusted to 85 to 90 atmospheres. The maximum temperature attained in the reactor coil was 246° C., and the duration of the progress of the product through the reactor coil lasted about 64 seconds. The almost colorless product had, according to analysis, the following compositions:

| | Percent |
|---|---|
| Oleic acid | 5.2 |
| Glycol or polyglycol | 0 |
| Ethyleneglycol monooleate | 82.2 |
| Ethyleneglycol dioleate | 11.2 |

Example 11

Erucic acid, still containing a small portion of a $C_{24}$ fatty acid, was reacted with so much of a sodium methylate solution, that the acid, after evaporation of the methanol under vacuum at a temperature of 80° to 100° C., contained 0.4% by weight of sodium. The catalyst-containing fatty acid and ethylene oxide (molar ratio of 1:1) were pumped through the previously described reactor at such a rate, that about 33 kg. of the addition product of 1 mol of ethylene oxide to 1 mol of erucic acid were produced per hour. The vapor pressure in the heat exchanger pressure jacket was adjusted to 30.9 atmospheres, corresponding to a temperature of 235° C., and the pressure in the reactor coil was adjusted to 85 to 95 atmospheres. The maximum temperature attained in the reactor coil was 242° C., and the duration of the passage of the product through the reactor coil lasted about 74 seconds. To determine the duration time, a density of the erucic acid of 0.847 was determined. The yellow-colored product had, according to analysis, the following composition:

| | Percent |
|---|---|
| Erucic acid | 2.5 |
| Glycol or polygylcol | 1.1 |
| Ethyleneglycol monoerucate | 82.4 |
| Ethyleneglycol dierucate | 12.0 |

Example 12

The ethyleneglycol mono-$C_8$ to $C_{10}$ fatty acid ester, obtained in Example 9, containing 0.24% by weight of sodium was; together with ethylene oxide at a molar ratio of 1:3, pumped through the previously described reactor at such a rate, that about 46.5 kg. of the addition product of 4 mols of ethylene oxide to 1 mol of $C_8$ to $C_{10}$ fatty acid were produced per hour. The vapor pressure in the heat exchanger pressure jacket was adjusted to 31.2 atmospheres, corresponding to the temperature of 235° C., and the pressure in the reactor coil was adjusted to 70 to 75 atmospheres. The maximum temperature attained in the reactor coil was 380° C., and the duration of the progress of the product through the reactor coil lasted about 56 seconds. The yellow-colored product had a monoester content of 57%.

Example 13

The ethyleneglycol mono-$C_{12}$ to $C_{18}$ fatty acid ester, obtained in Example 8, containing 0.25% by weight of sodium, was, together with ethylene oxide at a molar ratio of 1:3, pumped through the previously described reactor at such a rate, that about 59.9 kg. of the addition product of 4 mols of ethylene oxide to 1 mol of $C_{12}$ to $C_{18}$ fatty acid were produced per hour. The vapor pressure in the heat exchanger was adjusted to 30.3 atmospheres, corresponding to a temperature of 233° C., and the pressure in the reactor coil was adjusted to 85 to 90 atmospheres. The maximum temperature attained in the reactor coil was 390° C. and the duration of the progress of the product through the reactor coil lasted about 42 seconds. The dark-yellow product had a monoester content of 53%.

Example 14

The ethylene glycol monooleate, obtained in Example 10, containing 0.26% by weight of sodium, was, together ethylene oxide at a molar ratio of 1:3, pumped through the previously described reactor at such a rate, that about 78.6 kg. of the addition product of 4 mols of ethylene oxide to 1 mol of oleic acid were produced per hour. The vapor pressure in the heat exchanger pressure jacket was adjusted to 22.0 atmospheres, corresponding to a temperature of 216° C., and the pressure in the reactor coil was adjusted to 95 to 105 atmospheres. The maximum temperature attained in the reactor coil was 350° C., and the duration of the progress of the product through the reactor coil lasted about 32 seconds. The light-colored product had a monoester content of 45%.

Example 15

The addition product, obtained in Example 14, of 4 mols of ethylene oxide to 1 mol of oleic acid and having a catalyst content of 0.19% by weight of sodium, was pumped, together with ethylene oxide at a molar ratio of 1:4, through the previously described reactor at such a rate, that about 87.3 kg. of the addition product of 8 mols of ethylene oxide to 1 mol of oleic acid were produced per hour. The vapor pressure in the heat exchanger pressure jacket was adjusted to 20.2 atmospheres, corresponding to a temperature of 211° C., and the pressure in the reactor coil was adjusted to 70 to 80 atmospheres. The maximum temperature attained in the reactor coil was 344° C., and the duration of the progress of the product through the reactor coil lasted about 30 seconds. The yellow-colored product had a monoester content of 44%.

Example 16

The addition product, obtained in Example 14, of 4 mols of ethylene oxide to 1 mol of oleic acid and having a catalyst content of 0.19% by weight of sodium, was, together with ethylene oxide at a molar ratio of 1:6, pumped through the previously described reactor at such a rate that about 52.8 kg. of the addition product of 10 mols of ethylene oxide to 1 mol of oleic acid were produced per hour. The vapor pressure in the heat exchanger pressure jacket was adjusted to 20.0 atmospheres, corresponding to a temperature of 211° C., and the pressure in the reactor coil was adjusted to 80 to 90 atmospheres. The maximum temperature attained in the reactor coil was 344° C., and the duration of the passage of the product through the reactor coil lasted about 50 seconds. The yellow-colored product had a monoester content of 46%.

The advantage of the process of the invention consists in that it is possible, by following the process, to produce addition products of ethylene oxide to carboxylic acid with especially significant area-time yields. Particularly advantageous is the process of the invention with regard to the preparation of ethyleneglycol carboxylic acid monoesters, which can be produced not only with high area-time yields, but at the same time free of by-products to an extraordinary extent.

The preceding specific embodiments are illustrative of the process of the invention. It is to be understood, however, that other expedients known to those skilled in the art can be employed without departing from the spirit of the invention or the scope of the appended claims.

We claim:

1. A process for the continuous production of addition products of ethylene oxide with organic carboxylic acids which consists essentially of the steps of (a) continuously passing a mixture of an organic compound selected from the group consisting of organic carboxylic acids free from reactive hydrogen atoms other than the carboxyl hydrogen atom and addition products of ethylene oxide thereof, with ethylene oxide in a molar ratio of 1:1 to 1:6 in the presence of from 0.01% to 1% by weight of alkali metal based on said organic compound, of an alkali metal ethoxylation catalyst, through a jacketer reactor having a small cross-section compared to its length, under a pressure at which the reaction mixture is liquid, (b) heating said mixture while passing through said jacketed reactor to attain a maximum temperature of between about 230° and 390° C., (c) maintaining said mixture in said jacketed reactor for about 10 to 150 seconds, whereby an addition product is formed, (d) immediately cooling said addition product to a temperature below 180° C. after said addition product leaves said jacketed reactor, and (e) recovering said addition product.

2. The process of claim 1, step (a) wherein said alkali metal ethoxylation catalyst is present in an amount of between 0.05% and 0.5% by weight of alkali metal, based on said organic compound.

3. The process of claim 1, step (b) wherein said reaction mixture is heated to attain a maximum temperature of between 240° C. and 360° C.

4. The process of claim 1, step (c) wherein said mixture is maintained in said jacketed reactor for between about 15 and 80 seconds.

5. The process of claim 1, step (d) wherein said addition product is cooled to a temperature below 150° C., after said addition product leaves said jacketed reactor.

6. The process of claim 1, step (a) wherein said mixture is maintained at a pressure of between 50 and 110 atmospheres.

7. The process of claim 1, step (b) wherein said mixture is heated to such a degree, that after passing through the first half of said jacketed reactor, a temperature of between 170° and 240° C. is attained, and that, while passing through the second half of said jacketed reactor, a maximum temperature of between 240° and 390° C. is attained.

8. The process of claim 1 wherein a mixture of an organic carboxylic acid free from reactive hydrogen atoms other than the carboxyl hydrogen atoms with ethylene oxide in a molar ratio of 1:1 is utilized, the maximum temperature attained of said mixture is between 230° C. and 290° C., said mixture is maintained in said jacketed reactor for about 10 to 120 seconds and predominately ethylene glycol organic carboxylic acid monoesters are recovered.

9. The process of claim 1 wherein the interval between the obtention of said maximum temperature and the time said mixture leaves said jacketed reactor is between about 5% to 30% of the total duration of time said mixture is maintained in said jacketed reactor.

10. The process of claim 1 wherein said organic carboxylic acid free from reactive hydrogen atoms other than the carboxyl hydrogen atom is selected from the group consisting of alkanoic acids having 6 to 26 carbon atoms and alkenoic acids having 6 to 26 carbon atoms.

References Cited

UNITED STATES PATENTS

| | | | |
|---|---|---|---|
| 2,634,278 | 4/1953 | Kuhrt | 260—410.7 |
| 2,910,490 | 10/1959 | Malkemus | 260—410.6 |
| 3,433,824 | 3/1969 | Horsley | 260—486 |

JAMES A. PATTEN, Primary Examiner

R. S. WEISSBERG, Assistant Examiner

U.S. Cl. X.R.

260—468, 485, 486, 488, 496